US011156495B2

(12) United States Patent
Caregnato et al.

(10) Patent No.: US 11,156,495 B2
(45) Date of Patent: Oct. 26, 2021

(54) METHOD FOR CONTROLLING A WEIGHING DEVICE

(71) Applicant: SEB S.A., Ecully (FR)

(72) Inventors: Stéphane Daniel Paul Caregnato, Bloye (FR); Sébastien Drode, Lyons (FR); Stéphane Suchet, Marcellaz Albanais (FR); Philippe Masson, Hery sur Alby (FR)

(73) Assignee: SEB S.A., Ecully (FR)

( * ) Notice: Subject to any disclaimer, the term of this patent is extended or adjusted under 35 U.S.C. 154(b) by 276 days.

(21) Appl. No.: 15/762,033

(22) PCT Filed: Sep. 20, 2016

(86) PCT No.: PCT/FR2016/052383
§ 371 (c)(1),
(2) Date: Mar. 21, 2018

(87) PCT Pub. No.: WO2017/051112
PCT Pub. Date: Mar. 30, 2017

(65) Prior Publication Data
US 2018/0292254 A1    Oct. 11, 2018

(30) Foreign Application Priority Data
Sep. 22, 2015  (FR) ..................... 15/58922

(51) Int. Cl.
  *G01G 19/414* (2006.01)
  *G01G 19/56* (2006.01)
(52) U.S. Cl.
  CPC ........... *G01G 19/414* (2013.01); *G01G 19/56* (2013.01)

(58) Field of Classification Search
  CPC ... G01G 19/414; G01G 19/56; G01G 23/3735
  See application file for complete search history.

(56) References Cited

U.S. PATENT DOCUMENTS 8,829,365 B1    9/2014  Wallace et al.
2014/0318874 A1*  10/2014  Moses .................... G01G 19/56
                                                                177/1

FOREIGN PATENT DOCUMENTS

CN       101588665 A    11/2009
DE    202013101483 U1    4/2013
(Continued)

OTHER PUBLICATIONS

English Abstract DE202013101483, Mar. 20, 2018, 1 pp.
(Continued)

*Primary Examiner* — Toan M Le
(74) *Attorney, Agent, or Firm* — Cantor Colburn LLP

(57) ABSTRACT

Method for controlling a weighing device (DP) via a terminal (TER), comprising the following steps: using the terminal (TER) to generate and/or acquire a piece of control information (Cde) comprising at least one refresh (Ins_ra) or update instruction (Ins_ac) relating to a refresh or update cyclic period and/or duty cycle of a function of at least one functional element (F) of the weighing device (DP), and sending said piece of control information (Cde) to the control entity (C), and controlling method internal to a weighing device (DP) comprising the following steps: receiving a piece of control information (Cde) originating from a terminal (TER), and adapting the refresh or update cyclic period and/or duty cycle of said function of the at least one functional element (F) depending on the at least one received refresh (Ins_ra) or update (Ins_ac) instruction.

12 Claims, 3 Drawing Sheets

(56) References Cited

FOREIGN PATENT DOCUMENTS

EP 2700915 A1 2/2014
FR 2804519 A1 8/2001

OTHER PUBLICATIONS

English Abstract of EP2700915, Feb. 26, 2014, 2 pp.
English Abstract of FR2804519, Mar. 8, 2001, 1 pp.
International Search Report for Application No. PCT/FR2016/052383, Mar. 27, 2018, 7 pp.
CN Office Action for Application No. 201680054774.X; dated Aug. 5, 2019.

* cited by examiner

METHOD FOR CONTROLLING A WEIGHING DEVICE

CROSS REFERENCE TO RELATED APPLICATIONS

This application is a National Stage of PCT Application No. PCT/FR2016/052383 filed on Sep. 20, 2016, which claims priority to French Patent Application No. 15/58922 filed on Sep. 22, 2015, the contents each of which are incorporated herein by reference thereto.

TECHNICAL FIELD

The present invention concerns a method for controlling a weighing device by a terminal, particularly for guiding a user making a cooking recipe.

BACKGROUND

It is known to assist a user in developing a cooking recipe by providing him instructions displayed on a terminal. The user must then execute each step and then validate the performed steps. The terminal may be remote from the weighing device and be arranged to communicate with the weighing device according to a wireless communication protocol.

This arrangement is interesting in the sense that a piece of information coming from the weighing device can warn the terminal of the execution of a step, for example during a weighing operation when the target weight is reached.

It thus appears that the terminal acts as a remote control of the weighing device and allows managing remotely its functions such as the unit to be used for the weighing operation or a light display signaling to the user that the weighing device is capable of performing the weight measurement corresponding to a step of the recipe.

This communication between the weighing device and the terminal is satisfactory in that the user is correctly guided in the execution of the recipe so as not to forget any step and by making sure that each step is correctly executed before starting the next one.

However, making a cooking recipe is not restricted to a series of successive weighing operations: other types of steps must be performed such as the mixture of ingredients or waiting periods for example for letting a dough rest.

In such steps, the weighing device is turned on and all its functions are available. It thus constantly checks the state of its weight sensors and of its commands, even when these are not supposed to be requested. The time of execution of a recipe being quite variable from a few minutes to more than one hour (on average about twenty minutes), it appears that the weighing device is operating for several minutes per recipe without this being necessary.

Moreover, when the weighing device operates on cells or batteries, the energy saving is a crucial aspect.

BRIEF SUMMARY

The present invention aims at solving all or part of the drawbacks mentioned hereinabove.

For this purpose, the present invention concerns a method for controlling a weighing device by a terminal, the weighing device comprising an internal energy source, a control entity arranged to receive control pieces of information according to a communication protocol and at least one functional element capable of being controlled by the control entity, the control method comprising the following steps:
developing by the terminal and/or acquiring a control piece of information comprising at least one refresh or update instruction related to a cycle period and/or a duty cycle of refreshing or updating a function of the at least one functional element of the weighing device,
sending said control piece of information to the control entity according to the communication protocol.

The cycle period of refreshing or updating the functional element corresponds to the frequency of request of said functional element by the control entity.

The control method of the weighing device thus allows, by sending control pieces of information, adapting the request of a functional element according to the use requirements of the weighing device.

For example, a control piece of information may be sent when executing a cooking recipe step consisting in letting a dough, obtained during a previous step, rest.

This control piece of information will comprise, for example, an instruction related to the extension of the cycle period of refreshing the display and another instruction related to the extension of the cycle period of updating the weight measurement. In other words, it is about performing an inhibition of the weight measurement function.

It thus appears that this method for controlling the weighing device allows modulating the energy consumption of the weighing device while keeping available to the user the functions that he is likely to use depending on the context.

By contextual adaptation of the request of the functional elements, the method allows reducing the energy consumption of the controlled weighing device without affecting the use.

The same effect can be obtained by varying the refresh or update duty cycle. The duty cycle can be varied independently of the cycle period or in combination with the variation of the cycle period whether for a refresh or an update instruction.

According to an aspect of the invention, the control piece of information comprises a charge request related to the charge of the internal energy source. It is thus possible to interrogate the weighing device on its amount of energy in reserve.

According to an aspect of the invention, the acquisition corresponds to receiving a piece of information coming from a remote server, preferably capable of communicating according to the communication protocol or according to another protocol, with the terminal.

According to an aspect of the invention, the refresh or update instruction corresponds respectively to:
the cycle period and/or the duty cycle of refreshing a piece of information transmission device such as the display of a display device or a sound emission of an alarm or,
the cycle period and/or the duty cycle of updating an acquisition of a sensor, such as a weight sensor, or of a user interface, such as a control button.

It thus appears that, by defining a cycle period and/or the duty cycle to be applied by sending a control piece of information, it is possible to slow down the operating frequency of some functional elements of the weighing device.

Thus, it is possible to save the energy of the internal energy source for example by reducing to the minimum the monitoring frequency of the weight at the weight sensor or by not refreshing the display.

This arrangement is particularly interesting when the user of the weighing device does not use some functional elements in a given context.

According to an aspect of the invention, said control piece of information further comprises a setpoint instruction related to the execution of a task by a functional element.

Not only does the control piece of information allows, from the terminal, managing the energy consumption of the weighing device by requesting more or less the functional elements, but also this control piece of information allows remotely controlling the achievement of a task by the scale.

According to an aspect of the invention, a task may correspond to a weight in grams to be weighed, a liquid volume to be determined or a text to be displayed to the user of the weighing device.

According to an aspect of the invention, the method for controlling a weighing device by a terminal further comprises a step of receiving a monitoring piece of information coming from the weighing device, the monitoring piece of information comprising:
 a charge indication related to a state of charge of the internal energy source and/or
 a return indication related to a state of a functional element, such as a value acquired by a sensor or a user control obtained via a user interface, and/or said return indication related to an operating mode of a set of functional elements, an operating mode corresponding to a given definition of the states of the functional elements of said set.

An operating mode thus corresponds to a configuration of states reflecting a general operation of the weighing device DP. This configuration can be pre-established.

According to an example, an operating mode may be referred to as "full power operating mode". In this case, the definition of the states of the functional elements F is such that each functional element is requested to the maximum of its possibilities. Energy consumption is not a priority for this operating mode.

According to another example, an operating mode may be referred to as "battery saving operating mode". In this case, the functional elements are less requested and the energy consumption is reduced.

Other operating modes may also be provided, for example in order to favor the operation of some functional elements over others, for example less likely to be used in a given context.

It appears that the terminal is also capable of receiving monitoring pieces of information coming from the weighing device and informing on the actual state of the weighing device.

It is thus possible for the terminal to determine whether a setpoint instruction has been followed and, if necessary, receive an expected result, for example if a determined weight is to be weighed.

According to an aspect of the invention, the method for controlling a weighing device by a terminal comprises a step following the step of receiving the monitoring piece of information and consisting in developing and/or acquiring a control piece of information called subsequent control piece of information, then a step of sending said subsequent control piece of information to the control entity according to the communication protocol.

It is thus possible, after sending an elementary control piece of information, to receive a return coming from the weighing device which is the elementary monitoring piece of information.

Then, based on this elementary monitoring piece of information, the method allows developing and/or acquiring a subsequent control piece of information as a function of this elementary monitoring piece of information.

The method is therefore adapted to assist a user in the achievement of a cooking recipe with the assistance of the terminal. The terminal thus monitors the achievement of each preparation phase of the cooking recipe. Energy saving is then achieved without the user being disturbed while progressing in the preparation of the cooking recipe.

The present invention also concerns a computer program product comprising code instructions arranged to implement the steps of a method for controlling a weighing device by a terminal as described previously, when said program is executed on a processing unit of a terminal, in particular a portable communication terminal.

The present invention further concerns a terminal, in particular a portable communication terminal, comprising in memory the code instructions of a computer program product as described above and arranged to execute such a computer program product.

The present invention further concerns a control method internal to a weighing device, the weighing device comprising an internal energy source, a control entity arranged to receive a control piece of information according to a communication protocol and at least one functional element capable of being controlled by the control entity, the internal control method comprising the following steps:
 receiving a control piece of information coming from a terminal, the control piece of information comprising at least one refresh or update instruction related to a cycle period and/or a duty cycle of refreshing or updating a function of the at least one functional element of the weighing device,
 adapting the cycle period and/or the duty cycle of refreshing or updating said function of the at least one functional element according to the at least one received refresh or update instruction.

The weighing device is thus capable of adapting the request of its functional elements based on a control piece of information according to the communication protocol.

The weighing device can then be used while minimizing its energy consumption by providing to reduce the implementation frequency of functions that are not requested or that do not need to be requested according to the context.

According to an aspect of the invention, the control method internal to a weighing device further comprises a step of developing and sending a monitoring piece of information to a terminal according to a communication protocol, the monitoring piece of information comprising:
 a charge indication related to the state of charge of the internal energy source and/or
 a return indication related to a state of a functional element, such as a value acquired by a sensor or a user control obtained via a user interface, and/or said return indication related to an operating mode of a set of functional elements, which operating mode corresponding to a given definition of the states of the functional elements of said set.

Not only the weighing device is capable of regulating the request of these functional elements but it can also send monitoring pieces of information reporting the state of at least one functional element at a given time and measurement pieces of information coming from a sensor.

It is thus easy to communicate with a weighing device in order to recover measurements such as a measured weight or the validation of a user by pressing a button and also to send control pieces of information thereto in order to minimize its energy consumption.

According to an aspect of the invention, the control piece of information further comprises a setpoint instruction related to the execution of a task by a functional element.

The weighing device is thus capable of being controlled from a terminal capable of communicating according to the communication protocol.

The present invention also concerns a computer program product comprising code instructions arranged to implement the steps of a control method internal to a weighing device as described previously, when said program is executed on a control entity of a weighing device.

The present invention further concerns a weighing device comprising a control entity having in memory the code instructions of a computer program product as described above and arranged to execute such a computer program product.

BRIEF DESCRIPTION OF THE DRAWINGS

In any case, the invention will be better understood using the following description with reference to the appended schematic drawings representing, by way of non-restrictive example, an embodiment of this control method.

DETAILED DESCRIPTION

Figure 1:
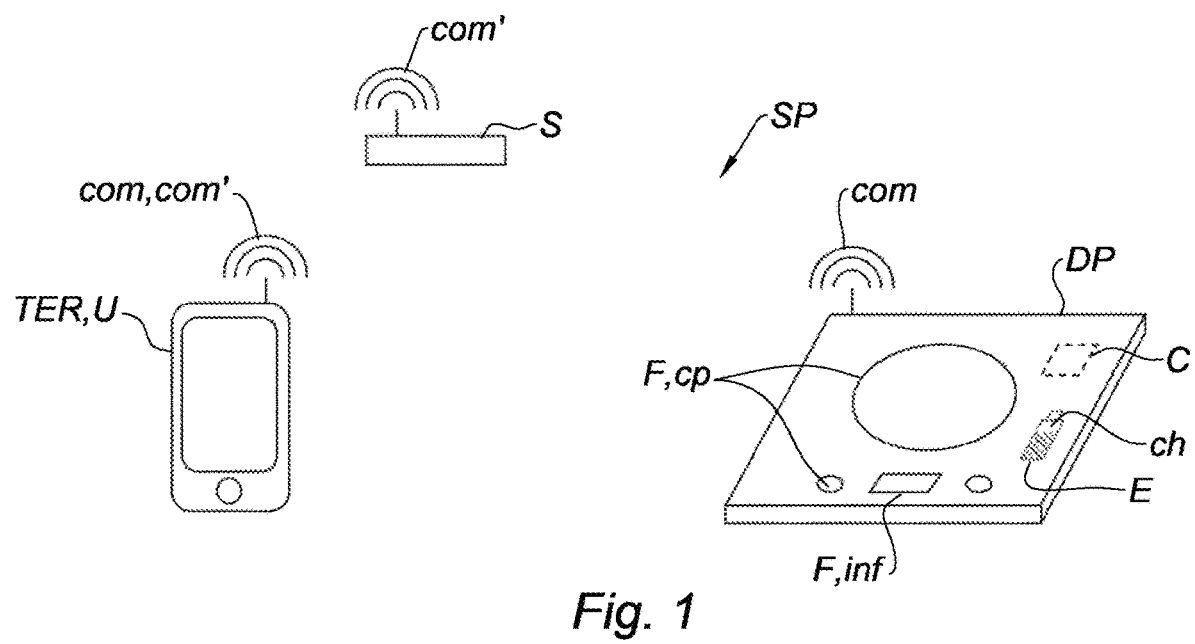
FIG. 1 is a schematic view of a weighing system comprising a weighing device, a terminal and a server.

As illustrated in FIG. 1, a weighing system SP comprises a weighing device DP, a terminal TER and a server S.

The weighing device DP is arranged to communicate with the terminal TER according to a communication protocol com such as a wireless protocol of the low-energy type.

The terminal TER and the server S are arranged to communicate according to a communication protocol com' that may be identical to or different from the communication protocol com.

The terminal TER comprises a processing unit U arranged to execute a method for controlling the weighing device DP by the terminal TER. To do this, the processing unit U comprises a computer program product in the form of code instructions of the executable application type.

The terminal TER is capable of sending a control piece of information Cde to the weighing device DP according to the communication protocol com.

The terminal TER can have this control piece of information Cde in memory or this control piece of information Cde could have been communicated thereto by the server S. It is also possible that the terminal TER has acquired this control piece of information Cde subsequently to a user input via an interface of the terminal TER.

The weighing device DP comprises an internal energy source E, a control entity C and functional elements F. The control entity C is arranged to control the functional elements F and to receive pieces of information on the state of each functional element F.

The functional elements F are of different types: it may be a sensor cp, such as a weight sensor, or a user interface, such as a control button. They can also be a piece of information transmitting device inf such as a display device or an alarm.

The control entity C is capable of receiving the control piece of information Cde communicated from the terminal TER. The control entity C is also capable of developing monitoring pieces of information ctr.

Each monitoring piece of information ctr comprises a charge indication ch on the state of charge of the internal energy source E and/or a return indication re related to a state of a functional element F, such as a value acquired by a sensor or a user control obtained via a user interface.

Figure 2:
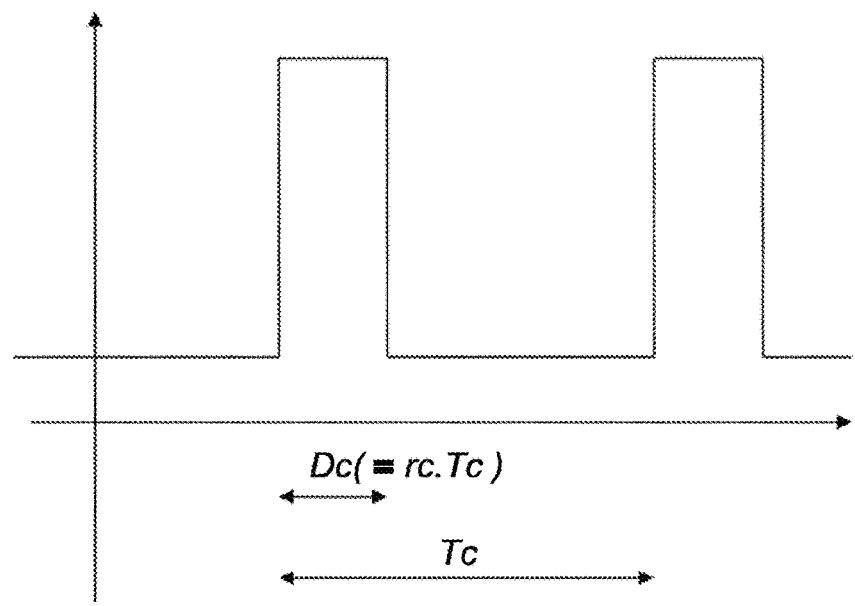
FIG. 2 is a graph showing the cycle period and the duty cycle of a refresh or update instruction.

As illustrated in FIG. 2, each functional element F is arranged to be refreshed—when it is a piece of information transmission device inf—or to be updated—when it is a sensor cp—according to a cycle period Tc and a duty cycle rc of refresh or update.

It thus appears that by defining a cyclic operation time Dc with respect to the cycle period Tc, the value of the duty cycle rc is defined. The abscissa axis corresponds therefore to time and the ordinate axis corresponds to the request of a functional element in a high position and to the absence of request in the low position.

Each functional element F is independently monitored by the control entity C according to its cycle period Tc and to its duty cycle rc. The functional elements F therefore do not operate permanently.

To do this, the control entity C comprises in memory code instructions of a computer program product for executing a control method internal to the control entity.

It should be also noted that in the absence of request of a functional element F, the control entity C can generate an autonomous control of the weighing device DP in order to allow the concerned functional elements F to progressively lower the energy consumption according to the request absence time.

The control entity C can develop monitoring pieces of information ctr in order to inform on the state of the functional elements F.

Figure 3:
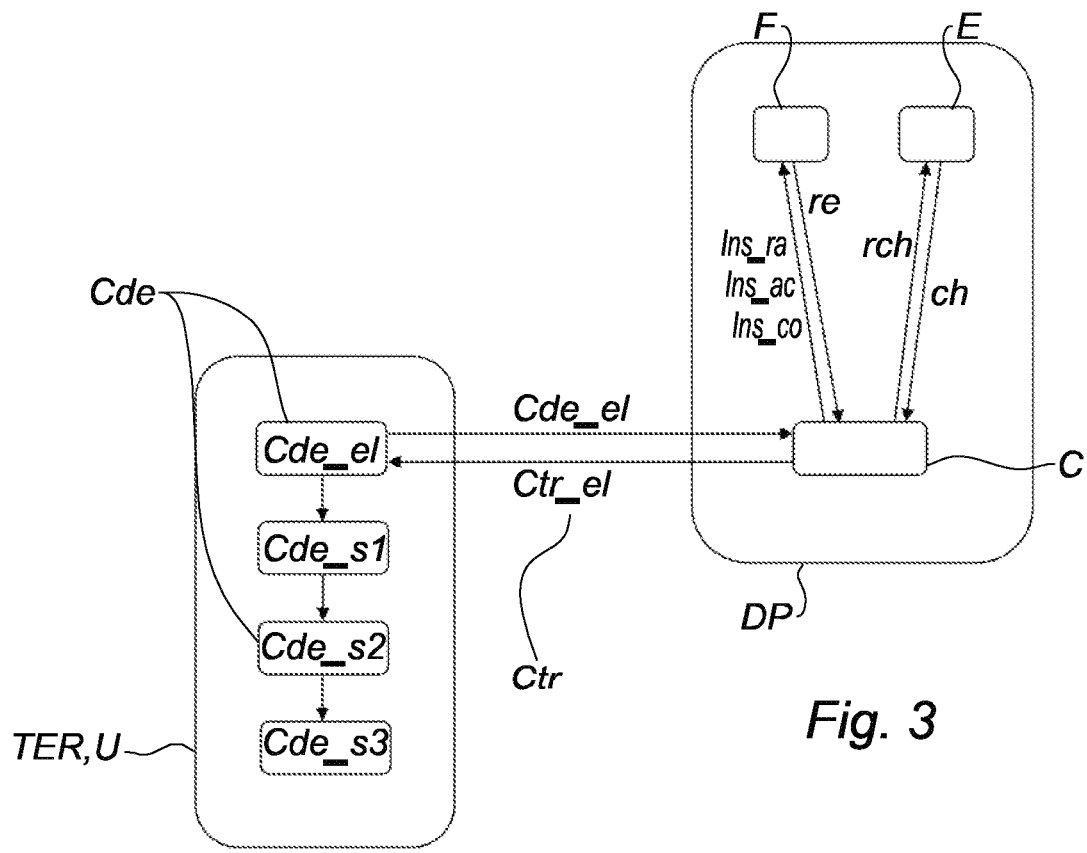
FIGS. 3 and 4 are diagrams illustrating the communication between the weighing device and the terminal.
Figure 4:
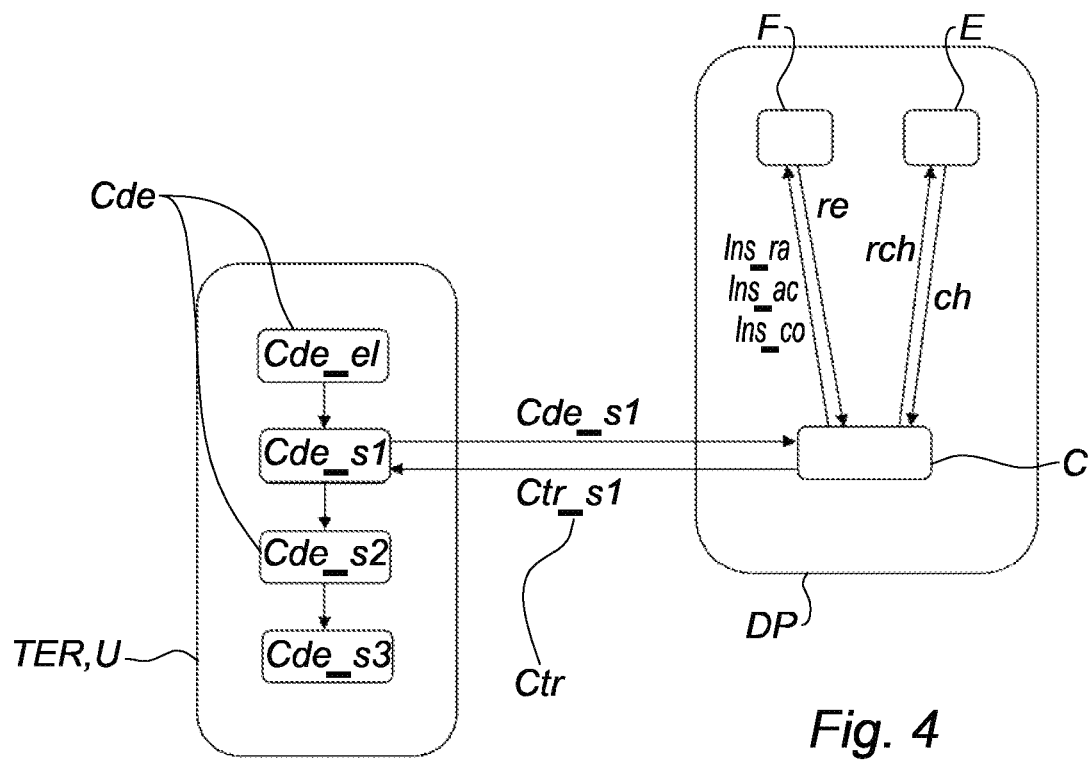

As illustrated in FIGS. 3 and 4, the terminal TER and the weighing device DP are arranged to exchange control pieces of information Cde and monitoring pieces of information ctr.

Figures 5, 6:
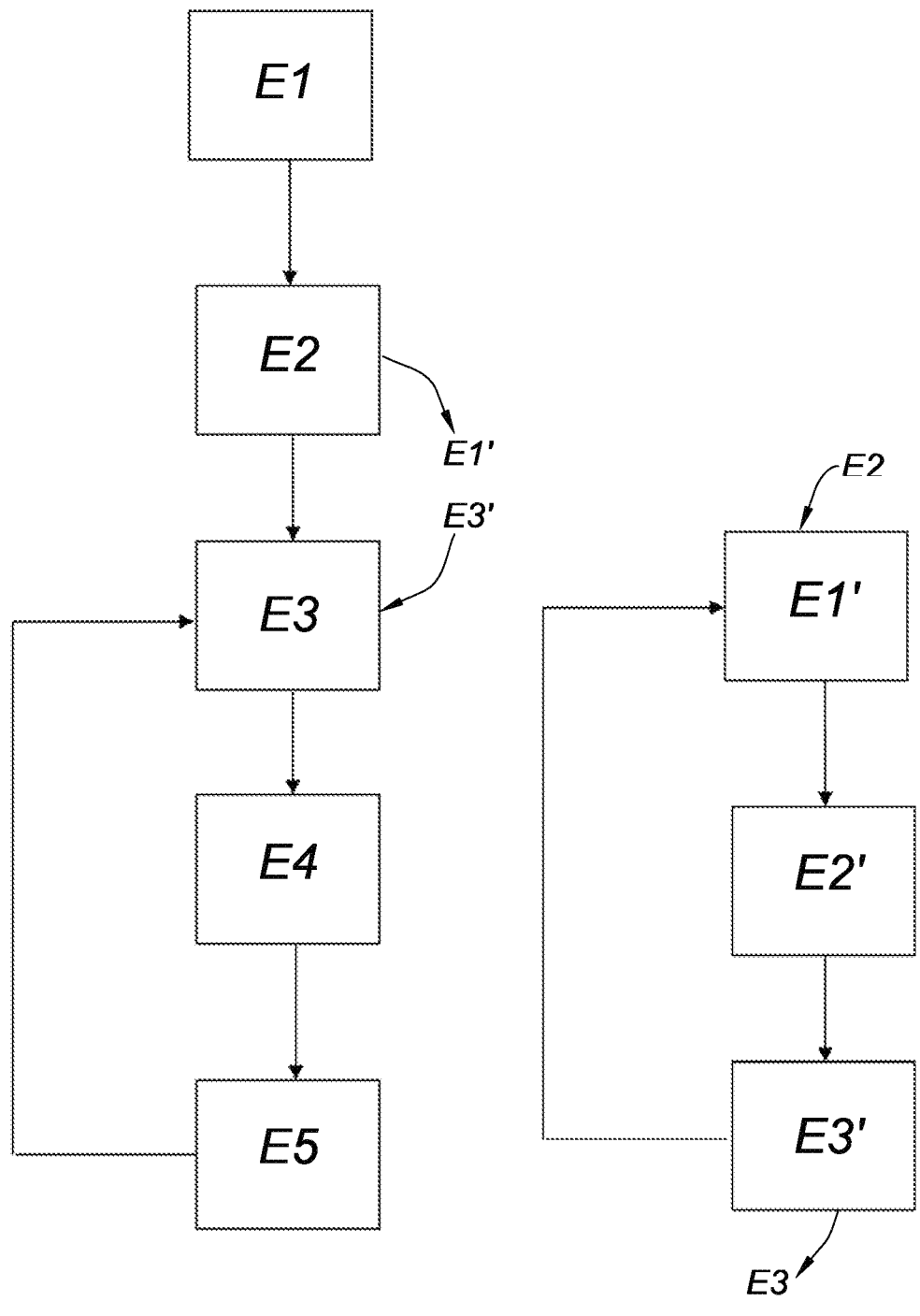
FIG. 5 is a flowchart showing the steps of a method for controlling a weighing device by a terminal.
FIG. 6 is a flowchart showing the steps of a control method internal to a weighing device.

The terminal TER is arranged to execute the steps of a method for controlling the weighing device DP illustrated in FIG. 5 and the weighing device DP is arranged to execute the steps of an internal control method illustrated in FIG. 6.

These two methods define the interactions between the terminal TER and the weighing device DP that allow guiding a user during the achievement of a cooking recipe while limiting the request of the functional elements, thus reducing the energy consumption of the internal energy source E.

The method for controlling the weighing device DP by the terminal TER comprises a step E1 of developing and/or acquiring by the terminal TER a control piece of information Cde comprising:
- at least one setpoint instruction Ins_co related to the execution of a task by a functional element F, the setpoint instruction Ins_co can be an instruction controlling the achievement of a weight measurement in a given unit with a target value or a display setpoint of a piece of information on the display device, of a reset of the weight (tare) or of a unit change,
- at least one refresh instruction Ins_ra or update instruction Ins_ac related to a cycle period Tc and/or a duty cycle rc of refreshing or updating a function of one or more functional element(s) F.

Optionally, the control piece of information may comprise a charge request rch that aims to interrogate the weighing device on the state of charge of the internal energy source E.

The method for controlling the weighing device DP by the terminal TER then comprises a step E2 of sending said control piece of information Cde to the weighing device DP.

Receiving this control piece of information Cde by the weighing device DP corresponds to step E1' of the control method internal to the weighing device DP.

The control method internal to the weighing device DP then comprises a step E2' of adapting the cycle period Tc and/or the duty cycle rc of refreshing or updating said function of the functional element F according to the at least one received refresh instruction Ins_ra or update instruction Ins_ac.

In parallel with this step E2', the setpoint instruction Ins_co is taken into account by the control entity C which achieves the requested task.

Then, or independently, depending on the case, a step E3' of the control method internal to the weighing device DP consists in developing and sending a monitoring piece of information ctr to the terminal TER.

This monitoring piece of information ctr is a piece of information feedback sent to the terminal TER and comprises in that sense at least one return indication re related to a state of a functional element F. It may be a value acquired by a sensor or a user control coming from the user interface.

This monitoring piece of information ctr may also comprise at least one return indication re related to an operating mode of a set of functional elements F.

An operating mode corresponds to a given definition of the states of the functional elements F of said set of functional elements F.

An operating mode then corresponds to a configuration of states reflecting a general operation of the weighing device DP. This configuration can be pre-established.

According to an example, an operating mode may be referred to as a "full power operating mode". In this case, the definition of the states of the functional elements F is such that each functional element is requested to the maximum of its possibilities. The energy consumption is not a priority for this operating mode.

According to another example, an operating mode may be referred to as a "battery saving operating mode". In this case, the functional elements are less requested and the energy consumption is reduced.

Other operating modes can also be provided, for example to favor the operation of some functional elements over others, which are for example less likely to be used in a given context.

The monitoring piece of information ctr may also comprise a charge indication ch related to the state of charge of the internal energy source E. This charge indication may be emitted from the initiative of the weighing device DP or after receiving a charge request rch coming from the terminal TER.

After sending the monitoring piece of information ctr, namely after step E3', the method for controlling the weighing device DP by the terminal TER continues with step E3 of receiving the monitoring piece of information ctr.

A step E4 following step E3 consists in developing and/or acquiring a control piece of information Cde called subsequent control piece of information Cde_s1 to Cde_s3.

This step is similar to step E1 with the difference that the subsequent control piece of information takes into account the monitoring piece of information received in step E3.

As illustrated in FIGS. 3 and 4, a sequence of control pieces of information Cde can be present in the memory of the processing unit U. Each control piece of information can correspond to a step of a cooking recipe, which has been represented by boxes connected by arrows to symbolize the order of the steps.

The first control piece of information Cde corresponds to a control piece of information called elementary control piece of information Cde_el. This elementary control piece of information Cde_el is sent by the terminal TER in step E2. It allows starting to make the recipe without any monitoring piece of information being received beforehand.

The weighing device DP then treats this elementary control piece of information Cde_el with steps E1' to E3'. If the elementary control piece of information Cde corresponds to a step of weighing for example 100 g of flour, it means that the elementary control piece of information Cde_el comprised for example:
- a setpoint instruction Ins_co requesting to perform the tare of the weight sensor, to switch the used unit to the gram and a target value set to 100 g,
- a refresh instruction Ins_ra defining the cycle period Tc and the duty cycle rc of refreshing the display of the weight; in this case, the cycle period Tc and the duty cycle rc are defined so that the user can easily see the increase in weight as he adds flour,
- an update instruction Ins_ac defining the cycle period Tc and the duty cycle rc of updating the acquisition of a signal coming from the weight sensor so that the measurement appears instantaneous to the user,
- an update instruction Ins_ac defining the cycle period Tc and the duty cycle rc of updating the acquisition of a signal coming from the control button so as to make acquisitions at spaced periods of time since the user does not have to request this functional element at this time of the recipe.

Once the target value is reached, the control entity C develops and then sends in step E3' a monitoring piece of information specifying that the target value has been reached. In FIG. 3, this monitoring piece of information has been called the elementary monitoring piece of information ctr_el since it corresponds to the elementary control piece of information Cde_el.

The terminal TER receives this elementary monitoring piece of information ctr_el and concludes that the corresponding step of the recipe has been carried out: the 100 g of flour have indeed been weighed.

As illustrated in FIG. 4, the terminal TER proceeds to step E4 and has a first subsequent control piece of information Cde_s1. This control piece of information is referred to as subsequent in the sense that it is only considered when the previous step has indeed been carried out and validated upon receiving the elementary monitoring piece of information ctr_el.

In this sense, a different subsequent control piece of information can be sent when the monitoring piece of information ctr is not the one expected.

In a step E5, the terminal sends said subsequent first control piece of information Cde_s1 to the control entity C.

In response, the weighing device DP executes again steps E1' to E3' by carrying out the task(s) that are required thereto by the setpoint instruction(s) Ins_co and adapting the cycle period(s) Tc and/or duty cycle(s) rc of the functional elements.

This principle of exchanging control pieces of information Cde and monitoring pieces of information ctr continues until each step of the recipe is executed.

The setpoint instructions Ins_co can be of several types: it can be the execution of a weighing operation as mentioned above, it can also be a tare, a change of unit or a time delay step corresponding for example to a rest period for a dough or to the waiting for the manual validation of a user at the control button after the manual achievement of a task such as a mixture of ingredients previously weighed.

A part of the control piece of information may also comprise a charge request rch to return to the terminal TER the state of charge ch of the internal energy source E. Possibly, the subsequent control piece of information has therefore been adapted by modifying the update instructions Ins_ac or the refresh instructions Ins_ra.

It therefore appears that, at any moment, each functional element F is configured in terms of cycle period Tc and/or duty cycle rc of refresh or update according to its use requirements.

This arrangement is in line with the energy saving for the internal energy source E while maintaining an optimal operation from the user's perspective during the execution of the recipe. Indeed, he does not realize that some functions are less frequently updated or refreshed because he is not supposed to use them.

It is therefore possible to remotely monitor a weighing device DP by a terminal TER for executing a task but also to configure the functional elements F so that at every moment the energy consumption is minimal.

It is thus possible to propose an advanced culinary assistance solution associating a mobile communication terminal and a scale while ensuring a user-friendly and fluid experience for the user as well as an operating autonomy of several years.

It goes without saying that the invention is not limited to the single embodiment of this control method, described hereinabove by way of example, on the contrary, it encompasses all the variants.

The invention claimed is:

1. A method for controlling a weighing device by a terminal, the weighing device comprising an internal energy source, a control entity arranged to receive control pieces of information according to a communication protocol and at least one functional element capable of being controlled by the control entity, the method comprising the following steps:

developing by the terminal and/or acquiring control pieces of information, each comprising at least one refresh instruction or update instruction related to a cycle period and/or a duty cycle of refreshing or updating a function of the at least one functional element of the weighing device, the refresh instruction or update instruction defining either an operating mode referred to as "full power operating mode" wherein each functional element is requested to operate at a maximum of its possibilities, or another operating mode referred to as "battery saving operating mode" wherein each functional element is less requested than in "full power operating mode" or other operating modes in order to favor the operation of some functional elements over others less likely to be used in a given context, the cycle period and/or duty cycle being defined according to the "full power operating mode" or the "battery saving operating mode" or one of the other operating modes, the control pieces of information being established to monitor the achievement of preparation phases of a cooking recipe by minimizing electrical consumption, the electrical consumption being minimized by modulating the cycle period and/or a duty cycle to inhibit the functional element(s) not needed during a particular preparation phase without affecting the use of required functional element(s) for this particular preparation phase, sending the control piece of information to the control entity according to the communication protocol, receiving a monitoring piece of information coming from the weighing device, the monitoring piece of information comprising: a charge indication related to a state of charge of the internal energy source and/or a return indication related to a state of a functional element, as the return indication related to a state of a functional element being a value acquired by a sensor or a user control obtained via a user interface, and/or the return indication being related to an operating mode of a set of functional elements, an operating mode corresponding to a given definition of the states of the functional elements of the set.

2. The method for controlling a weighing device by a terminal according to claim 1, according to which the refresh instruction or update instruction corresponds respectively to:

the cycle period and/or the duty cycle of refreshing a piece of information transmission device comprising the display of a display device or a sound emission of an alarm or, the cycle period and/or the duty cycle of updating the acquisition of the sensor.

3. The method for controlling a weighing device by a terminal according to claim 2, wherein the control piece of information further comprises a setpoint instruction related to the execution of a task by a functional element.

4. The method for controlling a weighing device by a terminal according to claim 2, wherein the sensor is one of; a weight sensor, a user interface, or a control button.

5. The method for controlling a weighing device by a terminal according to claim 1, wherein the control piece of information further comprises a setpoint instruction related to the execution of a task by a functional element.

6. The method for controlling a weighing device by a terminal according to claim 1, comprising a step following the step of receiving the monitoring piece of information and consisting in developing and/or acquiring a control piece of information called subsequent control piece of information, then a step of sending the subsequent control piece of information to the control entity according to the communication protocol.

7. A computer program product comprising code instructions arranged to implement the steps of a method according to claim 1, when the computer program product is executed on a processing unit of a terminal, in particular a portable communication terminal.

8. A control method internal to a weighing device, the weighing device comprising an internal energy source, a control entity arranged to receive control pieces of information according to a communication protocol and at least one functional element capable of being controlled by the control entity, the control method comprising the following steps:

receiving a control piece of information coming from a terminal, the control piece of information comprising at least one refresh instruction or an update instruction related to a cycle period and/or a duty cycle of refreshing or updating a function of the at least one functional element of the weighing device, the refresh instruction or update instruction defining either an operating mode referred to as "full power operating mode" wherein each functional element is requested to operate at a maximum of its possibilities, or another operating mode referred to as "battery saving operating mode" wherein each functional element is less requested than in "full power operating mode" or other operating modes, in order to favor the operation of some functional elements over others less likely to be used in a given context, the cycle period and/or duty cycle being defined according to the "full power operating mode" or the "battery saving operating mode" or one of the other operating modes, the control pieces of information being established to monitor the achievement of preparation phases of a cooking recipe by minimizing electrical consumption, the electrical consumption being minimized by modulating the cycle period and/or a duty cycle to inhibit the functional element(s) not needed during a particular preparation phase without affecting the use of required functional element(s) for this particular preparation phase, adapting the cycle period and/or the duty cycle of refreshing or updating the function of the at least one functional element according to at least one received refresh instruction or update instruction, of developing and sending a monitoring piece of information to a terminal according to a communication protocol, the monitoring piece of information comprising: a charge indication related to a state of charge of the internal energy source and/or a return indication related to a state of a functional element, as the return indication related to a state of a functional element being a value acquired by a sensor or a user control obtained via a user interface, and/or the return indication being related to an operating mode of a set of functional elements, an operating mode corresponding to a given definition of the states of the functional elements of the set.

9. The control method internal to a weighing device according to claim 8, wherein the control piece of information further comprises a setpoint instruction related to the execution of a task by a functional element.

10. A computer program product comprising code instructions arranged to implement the steps of a method according to claim 8, when the computer program product is executed on a control entity of a weighing device.

11. A weighing device comprising a control entity having in memory code instructions of the computer program product according to claim 10 and arranged to execute the computer program product.

12. The control method internal to a weighing device according to claim 8, wherein the control piece of information further comprises a setpoint instruction related to the execution of a task by a functional element.

* * * * *